US 8,545,587 B2

(12) United States Patent
Guimond et al.

(10) Patent No.: US 8,545,587 B2
(45) Date of Patent: Oct. 1, 2013

(54) MULTI-PHASE FILTER MEDIUM

(75) Inventors: Douglas M. Guimond, Townsend, MA (US); Mark Snyder, Nashua, NH (US)

(73) Assignee: Hollingsworth & Vose Company, East Walpole, MA (US)

( * ) Notice: Subject to any disclaimer, the term of this patent is extended or adjusted under 35 U.S.C. 154(b) by 0 days.

(21) Appl. No.: 13/304,678

(22) Filed: Nov. 27, 2011

(65) Prior Publication Data

US 2012/0067814 A1 Mar. 22, 2012

Related U.S. Application Data

(62) Division of application No. 12/488,033, filed on Jun. 19, 2009, now Pat. No. 8,357,220.

(60) Provisional application No. 61/112,617, filed on Nov. 7, 2008.

(51) Int. Cl.
*B01D 39/04* (2006.01)
*B01D 46/00* (2006.01)

(52) U.S. Cl.
USPC ............ 55/486; 442/381; 442/385; 442/413; 55/487; 55/524; 55/527; 55/528

(58) Field of Classification Search
USPC .................... 210/348–510.1; 123/123–133; 55/522–528; 442/327–417; 95/273–287
See application file for complete search history.

(56) References Cited

U.S. PATENT DOCUMENTS

| | | | |
|---|---|---|---|
| 853,981 A | 5/1907 | Kneuper | |
| 2,196,821 A | 4/1940 | Arnold | |
| 2,392,901 A | 1/1946 | Brown | |
| 2,928,765 A | 3/1960 | Kurjan et al. | |
| 3,353,682 A * | 11/1967 | Pall et al. | 210/505 |
| 3,855,133 A | 12/1974 | Roehsler | |
| 3,944,686 A | 3/1976 | Froberg | |
| 4,018,646 A | 4/1977 | Ruffo et al. | |
| 4,033,881 A | 7/1977 | Pall | |
| 4,048,953 A | 9/1977 | Froberg | |
| 4,455,195 A | 6/1984 | Kinsley | |
| 4,483,771 A | 11/1984 | Koch et al. | |
| 4,759,989 A | 7/1988 | Abe et al. | |
| 4,765,812 A | 8/1988 | Homonoff et al. | |
| 4,765,915 A | 8/1988 | Diehl | |
| 4,851,304 A | 7/1989 | Miwa et al. | |
| 4,904,385 A | 2/1990 | Wessling et al. | |

(Continued)

FOREIGN PATENT DOCUMENTS

| | | |
|---|---|---|
| DE | 3341486 A1 | 5/1985 |
| DE | 19854565 A1 | 5/2000 |

(Continued)

OTHER PUBLICATIONS

Invitation to Pay Additional Fees for International Application No. PCT/US2009/005963, mailed Feb. 1, 2010.

(Continued)

*Primary Examiner* — Duane Smith
*Assistant Examiner* — Thomas McKenzie
(74) *Attorney, Agent, or Firm* — Wolf, Greenfield & Sacks, P.C.

(57) ABSTRACT

Multi-phase filter media, as well as related articles, components, filter elements, and methods, are disclosed.

30 Claims, 3 Drawing Sheets

(56) References Cited

U.S. PATENT DOCUMENTS

| | | | |
|---|---|---|---|
| 5,021,284 A | 6/1991 | Miwa et al. | |
| 5,167,765 A | 12/1992 | Nielsen et al. | |
| 5,288,402 A | 2/1994 | Yoshida | |
| 5,567,231 A | 10/1996 | Yokoo et al. | |
| 5,571,604 A | 11/1996 | Sprang et al. | |
| 5,580,459 A | 12/1996 | Powers et al. | |
| 5,648,027 A | 7/1997 | Tajiri et al. | |
| 5,652,049 A | 7/1997 | Suzuki | |
| 5,672,399 A | 9/1997 | Kahlbaugh et al. | |
| 5,679,042 A | 10/1997 | Varona | |
| 5,708,162 A * | 1/1998 | Hilbig et al. | 536/124 |
| 5,785,725 A | 7/1998 | Cusick et al. | |
| 5,786,065 A | 7/1998 | Annis et al. | |
| 5,952,251 A | 9/1999 | Jackson et al. | |
| 6,171,684 B1 | 1/2001 | Kahlbaugh et al. | |
| 6,183,536 B1 | 2/2001 | Schultink et al. | |
| 6,251,224 B1 | 6/2001 | Dong | |
| 6,267,252 B1 | 7/2001 | Amsler | |
| 6,489,051 B1 | 12/2002 | Inoue | |
| 6,576,323 B2 | 6/2003 | Wise et al. | |
| 6,603,054 B2 | 8/2003 | Chen et al. | |
| 6,706,086 B2 | 3/2004 | Emig et al. | |
| 6,713,034 B2 | 3/2004 | Nakamura et al. | |
| 6,977,111 B2 | 12/2005 | Yamaguchi et al. | |
| 7,008,465 B2 | 3/2006 | Graham et al. | |
| 7,097,694 B1 | 8/2006 | Jaroszczyk et al. | |
| 7,137,510 B1 | 11/2006 | Klein et al. | |
| 7,278,542 B2 | 10/2007 | Dussaud et al. | |
| 7,314,497 B2 | 1/2008 | Kahlbaugh et al. | |
| 7,578,938 B2 | 8/2009 | Rokman et al. | |
| 7,603,917 B2 | 10/2009 | Graham et al. | |
| 7,918,913 B2 | 4/2011 | Kalayci et al. | |
| 7,930,760 B2 | 4/2011 | Coles et al. | |
| 8,133,306 B2 | 3/2012 | Quayle et al. | |
| 8,357,220 B2 | 1/2013 | Guimond et al. | |
| 2003/0082979 A1 | 5/2003 | Bean et al. | |
| 2003/0211799 A1 | 11/2003 | Yao et al. | |
| 2003/0220039 A1 | 11/2003 | Chen et al. | |
| 2003/0226792 A1 | 12/2003 | Tumbrink et al. | |
| 2004/0038014 A1 | 2/2004 | Schaefer et al. | |
| 2004/0116026 A1 | 6/2004 | Kubose et al. | |
| 2004/0211160 A1 | 10/2004 | Rammig et al. | |
| 2005/0006303 A1 | 1/2005 | Sanders | |
| 2005/0183405 A1 | 8/2005 | Gillingham et al. | |
| 2005/0210844 A1 | 9/2005 | Kahlbaugh et al. | |
| 2006/0096932 A1 * | 5/2006 | Dema et al. | 210/767 |
| 2006/0117728 A1 | 6/2006 | Dolan et al. | |
| 2006/0205306 A1 | 9/2006 | Rock et al. | |
| 2006/0272303 A1 | 12/2006 | Fujiwara et al. | |
| 2006/0277877 A1 | 12/2006 | Shields | |
| 2007/0021021 A1 | 1/2007 | Verdegan et al. | |
| 2007/0039300 A1 | 2/2007 | Kahlbaugh et al. | |
| 2007/0066176 A1 | 3/2007 | Wenstrup et al. | |
| 2007/0084786 A1 | 4/2007 | Smithies | |
| 2007/0175192 A1 | 8/2007 | Niakan et al. | |
| 2007/0175195 A1 | 8/2007 | Skirius et al. | |
| 2007/0180997 A1 | 8/2007 | Leir et al. | |
| 2007/0220852 A1 | 9/2007 | Lifshutz et al. | |
| 2008/0069991 A1 | 3/2008 | Kohli et al. | |
| 2008/0160856 A1 | 7/2008 | Chen et al. | |
| 2008/0245037 A1 | 10/2008 | Rogers et al. | |
| 2008/0314010 A1 | 12/2008 | Smithies et al. | |
| 2009/0042475 A1 | 2/2009 | Pourdeyhimi | |
| 2009/0077938 A1 | 3/2009 | Kume et al. | |
| 2009/0266759 A1 * | 10/2009 | Green | 210/489 |
| 2009/0301304 A1 | 12/2009 | Bass et al. | |
| 2010/0031618 A1 | 2/2010 | Grove, III | |
| 2010/0044289 A1 | 2/2010 | Koslow | |
| 2010/0116138 A1 | 5/2010 | Guimond et al. | |
| 2010/0133173 A1 | 6/2010 | Inagaki | |
| 2010/0187171 A1 | 7/2010 | Gupta | |
| 2010/0187712 A1 | 7/2010 | Gupta et al. | |
| 2010/0282682 A1 | 11/2010 | Eaton et al. | |
| 2010/0285101 A1 | 11/2010 | Moore et al. | |
| 2011/0259813 A1 | 10/2011 | Wertz et al. | |

FOREIGN PATENT DOCUMENTS

| | | |
|---|---|---|
| DE | 19922326 B4 | 2/2004 |
| EP | 0 109 282 B1 | 9/1988 |
| EP | 0 537 140 B1 | 10/1994 |
| EP | 0 847 784 A1 | 6/1998 |
| EP | 0 847 785 A1 | 6/1998 |
| EP | 0 847 786 A1 | 6/1998 |
| EP | 0 719 172 B1 | 4/2002 |
| EP | 0 793 990 B1 | 3/2003 |
| FR | 2828114 A1 | 2/2003 |
| GB | 1526448 A | 9/1978 |
| JP | 10-230114 A | 9/1998 |
| WO | WO 2004/033069 A2 | 4/2004 |
| WO | WO 2004/112956 A1 | 12/2004 |
| WO | WO 2007/076015 A2 | 7/2007 |
| WO | WO 2008/052970 A1 | 5/2008 |
| WO | WO 2008/103821 A2 | 8/2008 |

OTHER PUBLICATIONS

International Search Report and Written Opinion for International Application No. PCT/US2009/005963, mailed Jul. 21, 2010.
International Preliminary Report on Patentability for International Application No. PCT/US2009/005963, mailed May 19, 2011.
International Search Report and Written Opinion for International Application No. PCT/US2011/34074, mailed Jul. 11, 2011.
[No Author Listed] HV Product Table. Hollingsworth & Vose. Table. 1 page.
Deka et al., Filtration News. 2004;22(4): :24, 26, 28, 30, 32 and 33.
Kaukopaasi et al, Nonwoven Conference, 1991, p. 137-54.
Kaukopaasi et al, TAPPI Journal. 1992;75(1):127-32.
Lloyd et al., TAPPI Journal. 1998;81(11):194-202.
Montefusco et al., Filtration and Separation. 2005;42(2):30-1.
Rodman et al., Fibers for nonwovens with emphasis on filtration theory and applications. Albany International Research Co. Mansfield, MA. pp. 233-246, date N/A.

* cited by examiner

MULTI-PHASE FILTER MEDIUM

RELATED APPLICATIONS

The present application is a divisional of U.S. application Ser. No. 12/488,033, filed Jun. 19, 2009, which claims priority to U.S. Provisional Application No. 61/112,617 filed on Nov. 11, 2008 and entitled "Multi-Phase Filter Medium", both of which are hereby incorporated by reference in their entireties.

TECHNICAL FIELD

This disclosure relates to multi-phase filter media, as well as related articles, components, filter elements, and methods.

BACKGROUND

Filter media are used in a variety of systems. The media are typically used to remove undesirable materials (e.g., particles) from a liquid or gas by passing the liquid or gas through the media.

SUMMARY

In one aspect, this disclosure features an article that includes first and second phases. The first phase includes a first plurality of fibers and a second plurality of fibers different from the first plurality of fibers. The second phase includes a third plurality of fibers and a fourth plurality of fibers different from the third plurality of fibers. The third plurality of fibers are the same as or different from the first or second plurality of fibers. The fourth plurality of fibers are the same as or different from the first or second plurality of fibers. The air permeability of the first plurality of fibers is higher than the air permeability of the second plurality of fibers. The air permeability of the third plurality of fibers is higher than the air permeability of the fourth plurality of fibers. The air permeability of the fibers is defined in the Detailed Description section below. At least one of the first, second, third, and fourth pluralities of fibers are made from an organic polymeric material. The basis weight ratio of the first phase to the second phase is from about 30:70 to about 70:30. The article is configured as a filter medium.

In another aspect, this disclosure features an article that includes first and second phases. The first phase includes a first plurality of fibers and a second plurality of fibers different from the first plurality of fibers. The second phase includes a third plurality of fibers and a fourth plurality of fibers different from the third plurality of fibers. The third plurality of fibers are the same as or different from the first or second plurality of fibers. The fourth plurality of fibers are the same as or different from the first or second plurality of fibers. The pressure drop of the first plurality of fibers is lower than the pressure drop of the second plurality of fibers. The pressure drop of the third plurality of fibers is lower than the pressure drop of the fourth plurality of fibers. The pressure drop of the fibers is defined in the Detailed Description section below. At least one of the first, second, third, and fourth pluralities of fibers are made from an organic polymeric material. The basis weight ratio of the first phase to the second phase is from about 30:70 to about 70:30. The article is configured as a filter medium.

In another aspect, this disclosure features an article that includes first and second phases. The first phase includes a first plurality of softwood fibers. The second phase includes a first plurality of hardwood fibers. The basis weight ratio of the first phase to the second phase is from about 30:70 to about 70:30. The article is configured as a filter medium.

In another aspect, this disclosure features an article that includes first and second phases. The first phase includes first and second pluralities of fibers. The first plurality of fibers are prepared from a material (e.g., softwood fibers) different from a material (e.g., hardwood fibers or a different type of softwood fibers) used to prepare the second plurality of fibers. The second phase includes third and fourth pluralities of fibers. The third plurality of fibers are prepared from a material (e.g., softwood fibers) different from a material (e.g., hardwood fibers or a different type of softwood fibers) used to prepare the fourth plurality of fibers. The third plurality of fibers are the same as or different from the first or second plurality of fibers. The fourth plurality of fibers are the same as or different from the first or second plurality of fibers. The air permeability of the first plurality of fibers is higher than the air permeability of the second plurality of fibers. The air permeability of the third plurality of fibers is higher than the air permeability of the fourth plurality of fibers. The basis weight ratio of the first phase to the second phase is from about 30:70 to about 70:30. The article is configured as a filter medium.

In still another aspect, this disclosure features an article that includes first and second phases. The first phase includes first and second pluralities of fibers. The first plurality of fibers are prepared from a material (e.g., softwood fibers) different from a material (e.g., hardwood fibers or a different type of softwood fibers) used to prepare the second plurality of fibers. The second phase includes third and fourth pluralities of fibers. The third plurality of fibers are prepared from a material (e.g., softwood fibers) different from a material (e.g., hardwood fibers or a different type of softwood fibers) used to prepare the fourth plurality of fibers. The third plurality of fibers are the same as or different from the first or second plurality of fibers. The fourth plurality of fibers are the same as or different from the first or second plurality of fibers. The pressure drop of the first plurality of fibers is lower than the pressure drop of the second plurality of fibers. The pressure drop of the third plurality of fibers is lower than the pressure drop of the fourth plurality of fibers. The basis weight ratio of the first phase to the second phase is from about 30:70 to about 70:30. The article is configured as a filter medium.

In still another aspect, this disclosure features an article that includes first and second phases. The first phase includes a first plurality of fibers and a second plurality of fibers different from the first plurality of fibers. The second phase includes a third plurality of fibers and a fourth plurality of fibers different from the third plurality of fibers. The third plurality of fibers are the same as or different from the first or second plurality of fibers. The fourth plurality of fibers are the same as or different from the first or second plurality of fibers.

The air permeability of the first plurality of fibers is higher than the air permeability of the second plurality of fibers. The air permeability of the third plurality of fibers is higher than the air permeability of the fourth plurality of fibers. At least one of the first, second, third, and fourth pluralities of fibers are made from an organic polymeric material. The first phase has a higher air permeability than the second phase. The basis weight ratio of the first phase to the second phase is about 30:70 or greater. The article is configured as a filter medium.

In yet another aspect, this disclosure features a filter element that includes one of the articles described above.

In a further aspect, this disclosure features a method that includes (1) disposing through a wet laid process a first dispersion containing first and second pluralities of fibers described above in a first solvent onto a wire to form a first phase, (2) while the first and second pluralities of fibers are on the wire, disposing a second dispersion containing third and fourth pluralities of fibers described above in a second solvent onto the first and second pluralities of fibers to form a second phase, and (3) at least partially removing the first and second solvents, thereby resulting in one of the articles described above.

Embodiments can include one or more of the following features.

The air permeability of the first or third plurality of fibers can be from about 50 CFM to about 350 CFM (e.g., from about 100 CFM to about 200 CFM). The air permeability of the second or fourth plurality of fibers can be from about 5 CFM to about 50 CFM (e.g., from about 15 CFM to about 25 CFM).

The weight ratio of the first and second pluralities of fibers can be from about 50:50 to about 90:10 (e.g., from about 50:50 to about 70:30 or from about 60:40 to about 70:30). The weight ratio of the third and fourth pluralities of fibers can be from about 10:90 to about 50:50 (e.g., from about 25:75 to about 50:50 or from about 30:70 to about 50:50).

The pressure drop of the first or third plurality of fibers can be from about 5 Pa to about 300 Pa (e.g., from about 20 Pa to about 100 Pa). The pressure drop of the second or fourth plurality of fibers can be from about 300 Pa to about 1,000 Pa (e.g., from about 250 Pa to about 500 Pa).

The first or third plurality of fibers can have an average fiber length from about 1.5 mm to about 6 mm. The second or fourth plurality of fibers can have an average fiber length from about 0.5 mm to about 2 mm.

The first or third plurality of fibers can include softwood fibers (e.g., fibers obtained from mercerized southern pine, northern bleached softwood kraft, southern bleached softwood kraft, or chemically treated mechanical pulps), cotton fibers, polyester fibers, polyvinyl alcohol binder fibers, or rayon fibers. The second or fourth plurality of fibers can include hardwood fibers (e.g., fibers obtained from Eucalyptus), polyethylene fibers, or polypropylene fibers.

The basis weight ratio of the first and second phases can be from about 30:70 to about 70:30, from about 40:60 to about 60:40, or from about 30:70 to about 90:10. In certain embodiments, the basis weight ratio of the first and second phases is about 30:70 or greater (e.g., about 40:60 or greater, about 50:50 or greater, or about 60:40 or greater). In some cases, the first phase has a higher air permeability than the second phase.

The article can further include a binder (e.g., polyvinyl acetate, an epoxy, a polyester, a polyvinyl alcohol, an acrylic such as a styrene acrylic, or a phenolic resin). The binder can be at least about 2% or at most about 35% of the basis weight of the article.

The article can have an average pore size from about 3 microns to about 1,000 microns (e.g., from about 25 microns to about 125 microns).

The article can have a dust holding capacity from about 0.3 g to about 3 g (e.g., from about 1 g to about 3 g) measured according to a Palas flat sheet test.

The article can have an initial dust capture efficiency from about 25% to about 99.5% (e.g., from about 60% to about 99.5%).

The first and third pluralities of fibers can be prepared from the same material, or the second and fourth pluralities of fibers can be prepared from the same material. The first and second pluralities of fibers can be prepared from the same material, or the third and fourth pluralities of fibers can be prepared from the same material.

The first plurality of fibers can be prepared from a material different from a material used to prepare the second plurality of fibers, or the third plurality of fibers can be prepared from a material different from a material used to prepare the fourth plurality of fibers.

Each of the first, second, third, and fourth pluralities of fibers can be made from an organic polymeric material.

The first or second phase can include one or more additional pluralities of fibers.

The interface between the first and second phases can be substantially non-linear or substantially free of an adhesive.

The filter element can include a radial filter element, a panel filter element, or a channel flow element.

The filter element can include a gas turbine filter element, a dust collector element, a heavy duty air filter element (e.g., containing a filter medium in which the weight ratio of the first and second pluralities of fibers is from about 85:15, and the weight ratio of the third and fourth pluralities of fibers is from about 49:51), an automotive air filter element (e.g., containing a filter medium in which the first phase includes three pluralities of fibers with a weight ratio of about 83:10:7, and the second phase includes three pluralities of fibers with a weight ratio of about 40:35:25), a HVAC air filter element, a HEPA filter element, a vacuum bag filter element, a fuel filter element, or an oil filter element.

The first phase can further include a second plurality of hardwood fibers, the second plurality of hardwood fibers being the same as or different from the first plurality of hardwood fibers.

The second phase can further include a second plurality of softwood fibers, the second plurality of softwood fibers being the same as or different from the first plurality of softwood fibers.

Embodiments can provide one or more of the following advantages.

Without wishing to be bound by theory, it is believed that, by blending fibers with different characteristics in one or more phases, one can obtain a filter medium having a multi-phase structure (e.g., having phases with different air permeabilities and/or pressure drops) with significantly improved dust holding capacity and/or dust capture efficiency without substantial degradation in mechanical strength compared to a filter medium having a single phase structure (e.g., having a uniform air permeability and/or pressure drop within the structure).

Other features, objects, and advantages of the invention will be apparent from the description, drawings, and claims.

DESCRIPTION OF DRAWINGS

Like reference symbols in the various drawings indicate like elements.

DETAILED DESCRIPTION

Figure 1:
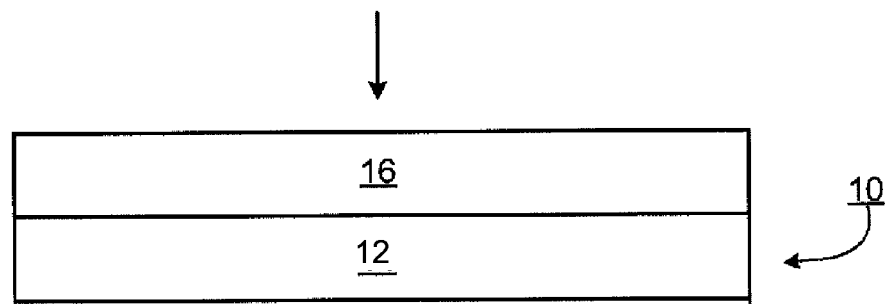
FIG. 1 is a cross-sectional view of a filter medium.
Figure 2:
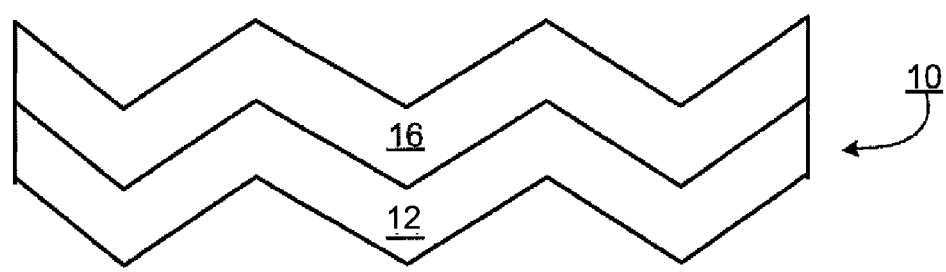
FIG. 2 is a cross-sectional view of a pleated filter medium.
Figure 3:
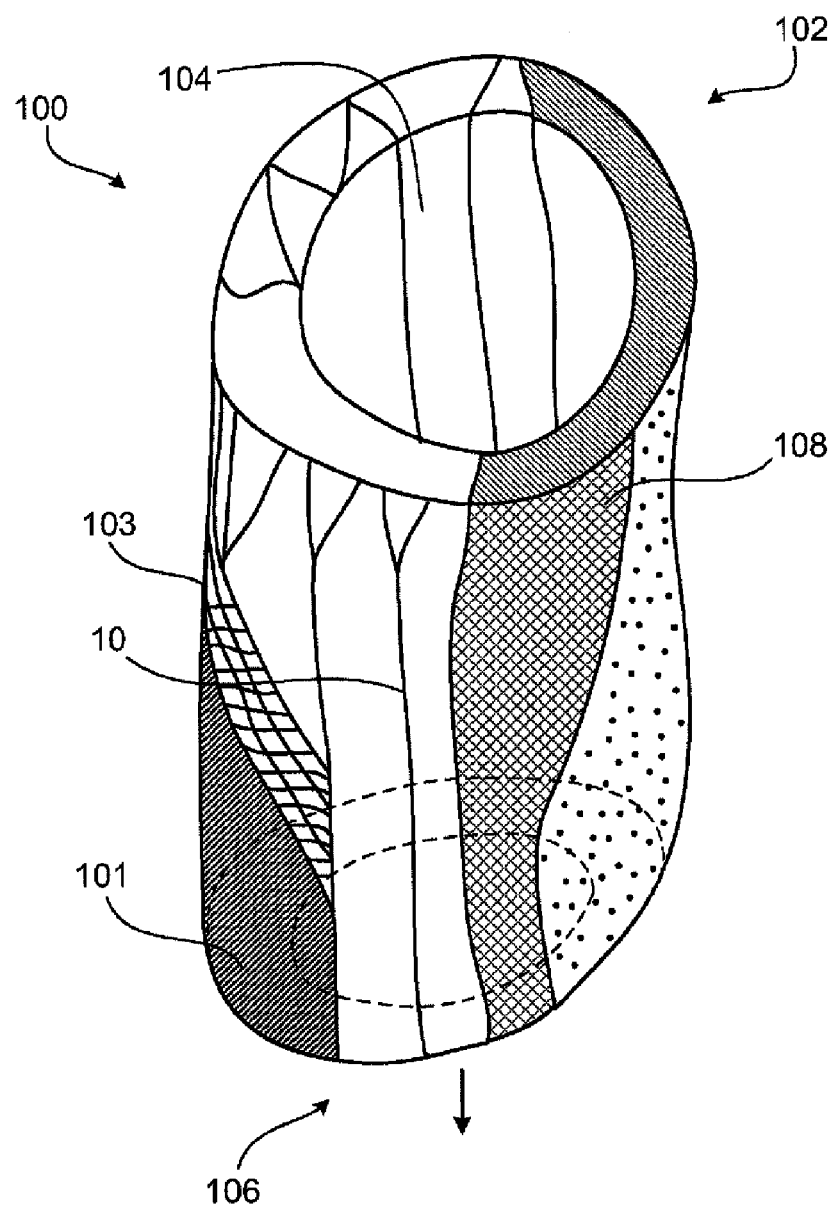
FIG. 3 is partial cut-away perspective view of a filter element including a filter medium.
Figure 4:
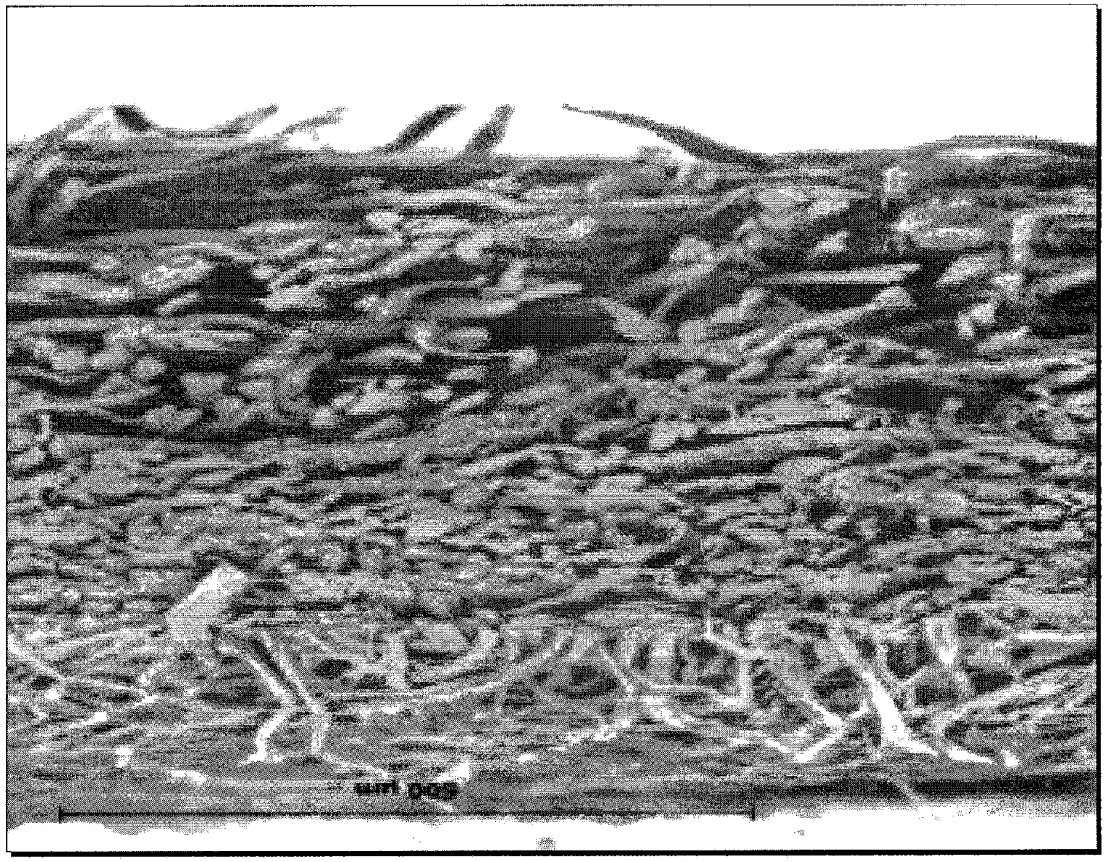
FIG. 4 is a scanning electron microscope graph illustrating a cross-sectional view of a dual phase filter medium.

This disclosure relates to multi-phase filter media, as well as related articles, components, filter elements, and methods. FIG. 1 is a cross-sectional view of an exemplary filter medium 10 that includes a first phase 12 and a second phase 16. FIG. 2 depicts a typical pleated configuration of filter medium 10. FIG. 3 shows a cut-away perspective of an exemplary filter element 100 including a filter housing 101, a filter cartridge 102, an inner screen 108 and an outer screen 103. Filter medium 10 is disposed in filter cartridge 102. During use, a gas or liquid enters element 100 via an opening 104 and then passes through inner screen 108, filter medium 10 and outer screen 103. The gas or liquid then exits filter element 100 via opening 106. FIG. 4 is a scanning electron microscope graph illustrating a cross-sectional view of an exemplary filter medium 10.

I. FILTER MEDIUM

As shown in FIG. 1, filter medium 10 includes a first phase 12 and a second phase 16. In some embodiments, first phase 12 has a larger air permeability and/or a smaller pressure drop than those of second phase 16. Such a phase 12 is hereinafter referred to as an open phase, and such a phase 16 is hereinafter referred to as a tight phase. The order of open and tight phases in filter medium 10 is not critical. In some embodiment, first phase 12 can be a tight phase and second phase 16 can be an open phase.

Without wishing to be bound by theory, it is believed that a filter medium having a multi-phase structure (e.g., having phases with different air permeabilities and/or pressure drops) exhibits significantly improved dust holding capacity and/or dust capture efficiency compared to a filter medium having a single-phase structure (e.g., having a uniform air permeability and/or pressure drop within the structure).

A. Open Phase

An open phase in filter medium 10 typically includes a first plurality of fibers and a second plurality of fibers, although in some embodiments, only a first plurality of fibers is used to form the open phase.

In some embodiments, the first plurality of fibers have an air permeability larger than that of the second plurality of fibers. For example, the first plurality of fibers can have an air permeability from about 50 cubic feet per minute ("CFM") to about 350 CFM (e.g., from about 100 CFM to about 200 CFM), and the second plurality of fibers can have an air permeability from about 5 CFM to about 50 CFM (e.g., from about 8 CFM to about 37 CFM or from about 15 CFM to about 25 CFM). As used herein, air permeability of fibers is determined by measuring the air permeability of a hand sheet produced exclusively by such fibers and having a basis weight of 100 g/m$^2$ according to ISO 9237.

In some embodiments, the first plurality of fibers have a pressure drop smaller than that of the second plurality of fibers. For example, the first plurality of fibers can have a pressure drop from about 5 Pascals ("Pa") to about 300 Pa (e.g., from about 10 Pa to about 250 Pa or from about 20 Pa to about 100 Pa), and the second plurality of fibers can have a pressure drop from about 300 Pa to about 1,000 Pa (e.g., from about 350 Pa to about 500 Pa). As used herein, pressure drop of fibers is determined by using a gas having a face velocity of 40 cm/s on a hand sheet produced exclusively by such fibers and having a basis weight of 100 g/m$^2$ according to ASTM F778-88.

In some embodiments, the first plurality of fibers have an average fiber length larger than that of the second plurality of fibers. For example, the first plurality of fibers can have an average fiber length from about 1.5 mm to about 6 mm (e.g., from about 2.5 mm to about 4.5 mm), and the second plurality of fibers can have an average fiber length from about 0.5 mm to about 2 mm (e.g., from about 0.7 mm to about 1.5 mm).

In general, the materials that can be used to form the first and second pluralities of fibers can vary as desired. In some embodiments, the first plurality of fibers are made from softwood fibers, cotton fibers, glass fibers, polyester fibers, polyvinyl alcohol binder fibers, or rayon fibers. Exemplary softwood fibers include fibers obtained from mercerized southern pine ("mercerized southern pine fibers or HPZ fibers"), northern bleached softwood kraft (e.g., fibers obtained from Robur Flash ("Robur Flash fibers")), southern bleached softwood kraft (e.g., fibers obtained from Brunswick pine ("Brunswick pine fibers")), or chemically treated mechanical pulps ("CTMP fibers"). For example, HPZ fibers can be obtained from Buckeye Technologies, Inc., Memphis, Tenn.; Robur Flash fibers can be obtained from Rottneros AB, Stockholm, Sweden; and Brunswick pine fibers can be obtained from Georgia-Pacific, Atlanta, Ga.

In some embodiments, the second plurality of fibers are made from hardwood fibers, polyethylene fibers, or polypropylene fibers. Exemplary hardwood fibers include fibers obtained from Eucalyptus ("Eucalyptus fibers"). Eucalyptus fibers are commercially available from, e.g., (1) Suzano Group, Suzano, Brazil ("Suzano fibers"), (2) Group Portucel Soporcel, Cacia, Portugal ("Cacia fibers"), (3) Tembec, Inc., Temiscaming, QC, Canada ("Tarascon fibers"), (4) Kartonimex Intercell, Duesseldorf, Germany, ("Acacia fibers"), (5) Mead-Westvaco, Stamford, Conn. ("Westvaco fibers"), and (6) Georgia-Pacific, Atlanta, Ga. ("Leaf River fibers"). In general, softwood fibers have a relatively large air permeability, small pressure drop, and large average fiber length compared to hardwood fibers.

In some embodiments, an open phase can include a mixture of softwood fibers and hardwood fibers. In certain embodiments, the open phase can include only one type of fibers (e.g., softwood fibers) uniformly distributed within the open phase.

In some embodiments, an open phase can include a mixture of fibers with different characteristics (e.g., different air permeabilities and/or pressure drops). Fibers with different characteristics can be made from one material (e.g., by using different process conditions) or different materials.

In some embodiments, the first plurality of fibers can be formed from a material identical to the material used to form the second plurality of fibers. In such embodiments, the first and second pluralities of fibers can be prepared by using different preparation methods, or different conditions in the same preparation method, such that they have different characteristics (e.g., different air permeabilities or pressure drops). In certain embodiments, the first and second pluralities of fibers can be formed of the same material and also have the same characteristics. In some embodiments, the first plurality of fibers can be formed from a material different from the material used to form the second plurality of fibers.

Generally, the weight ratio of the first and second plurality of fibers can vary depending on the desired properties of filter medium 10. An open phase in filter medium 10 typically includes fibers with a larger air permeability and/or a smaller pressure drop in an amount larger than the amount of fibers with a smaller air permeability and/or a larger pressure drop. For example, a weight ratio of the first and second pluralities of fibers described above can range from about 50:50 to about 97:3 (e.g., from about 50:50 to about 70:30 or from about 60:40 to about 70:30). As used herein, the weight of the first or second plurality of fibers refers to the initial weight of each group of fibers in a composition (e.g., a pulp) used to prepare the open phase. In certain embodiments, an open phase in filter medium 10 can include fibers with a larger air permeability and/or a smaller pressure drop in an amount equal to or smaller than the amount of fibers with a smaller air permeability and/or a larger pressure drop.

In some embodiments, an open phase can include one or more pluralities of fibers in addition to the first and second pluralities of fibers. Each of the additional pluralities of fibers can have characteristics (e.g., air permeability and/or pressure drop) different from the first or second plurality of fibers, or can be prepared from a material different from those used to prepare the first or second plurality of fibers. In some embodiments, an additional plurality of fibers can be prepared from a material identical to a material used to form one of the first and second pluralities of fibers, but still have characteristics different from those of the first or second plurality of fibers.

B. Tight Phase

A tight phase in filter medium 10 typically includes a third plurality of fibers and a fourth plurality of fibers.

In some embodiments, the third plurality of fibers can have the same characteristics (e.g., air permeability and/or pressure drop) or be made from the same type of material as the first or second plurality of fibers described above, and the fourth plurality of fibers can have the same characteristics or be made from the same type of material as the first or second plurality of fibers described above.

In some embodiments, the third plurality of fibers can have one or more characteristics (e.g., air permeability and/or pressure drop), or be made from a type of material, different from those of the first or second plurality of fibers, and the fourth plurality of fibers can have one or more characteristics, or be made from a type of material, different from those of the first or second plurality of fibers.

In some embodiments, a tight phase can include a mixture of softwood fibers and hardwood fibers. In certain embodiments, the tight phase can include only one type of fibers (e.g., hardwood fibers) uniformly distributed within the tight phase.

In some embodiments, a tight phase can include a mixture of fibers with different characteristics (e.g., different air permeabilities and/or pressure drops). Fibers with different characteristics can be made from one material (e.g., by using different process conditions) or different materials.

In some embodiments, the third plurality of fibers can be formed from a material identical to the material used to form the fourth plurality of fibers. In such embodiments, the third and fourth pluralities of fibers can be prepared by using different preparation methods, or different conditions in the same preparation method, such that they have different characteristics (e.g., different air permeability or pressure drop). In certain embodiments, the third and fourth pluralities of fibers can be formed of the same material and also have the same characteristics. In some embodiments, the third plurality of fibers can be formed from a material different from the material used to form the fourth plurality of fibers.

Generally, the weight ratio of the third and fourth plurality of fibers can vary depending on the desired properties of filter medium 10 or its intended uses. A tight phase in filter medium 10 typically includes fibers with a higher air permeability and/or a smaller pressure drop in an amount smaller than the amount of fibers with a smaller air permeability and/or a larger pressure drop. For example, a weight ratio of the third and fourth pluralities of fibers described above can range from about 3:97 to about 50:50 (e.g., from about 25:75 to about 50:50 or from about 70:30 to about 50:50). As used herein, the weight of the third or fourth plurality of fibers refers to the initial weight of each group of fibers in a composition (e.g., a pulp) used to prepare the tight phase. In some embodiments, a tight phase in filter medium 10 can include fibers with a higher air permeability and/or a smaller pressure drop in an amount larger than or equal to the amount of fibers with a smaller air permeability and/or a larger pressure drop.

In some embodiments, a tight phase can include one or more pluralities of fibers in addition to the third and fourth pluralities of fibers. Each of the additional pluralities of fibers can have characteristics (e.g., air permeability or pressure drop) different from the third or fourth plurality of fibers, or can be prepared from a material different from those used to prepare the third or fourth plurality of fibers. In some embodiments, an additional plurality of fibers can be prepared from a material identical to a material used to form one of the third and fourth pluralities of fibers, but still have characteristics different from those of the third or fourth plurality of fibers.

In general, the weight ratio of the open and tight phases in filter medium 10 can vary as desired. For example, a basis weight ratio of the open and tight phases can range from about 10:90 to about 90:10 (e.g., from about 30:70 to about 70:30, from about 40:60 to about 60:40, or from about 30:70 to about 90:10). In certain embodiments, the basis weight ratio of the open and tight phases is about 30:70 or greater (e.g., about 40:60 or greater, about 50:50 or greater, or about 60:40 or greater). As used herein, basis weight of an open or tight phase refers to the weight of the phase over a unit area (e.g., per square meter). For example, the basis weight of an open or tight phase can have a unit of grams per square meter.

C. Filter Medium Properties

In general, the thickness of filter medium 10 can vary as desired. For example, filter medium 10 can have a thickness from 100 microns to 2,000 microns (e.g., from 300 microns to 1,000 microns or from 400 microns to 750 microns). The thickness may be determined according to the standard TAPPI T411.

Generally, filter medium 10 can have any desired basis weight. For example, filter medium 10 can have a basis weight of at least about 10 g/m$^2$ (e.g., at least about 50 g/m$^2$ or at least about 100 g/m$^2$) and/or at most about 500 g/m$^2$ (e.g. at most about 250 g/m$^2$ or at most about 200 g/m$^2$). As used herein, basis weight of a filter medium refers to the weight of the medium over a unit area (e.g., per square meter). A typical unit for the basis weight is g/m$^2$.

The air permeability of filter medium 10 can usually be selected as desired. For example, the air permeability of filter medium 10 can be at least about 2 CFM (e.g., at least about 5 CFM, at least about 10 CFM, or at least about 30 CFM) and/or at most about 200 CFM (e.g., at most about 160 CFM, at most about 120 CFM, or at most about 80 CFM). As used herein, air permeability of a filter medium is determined according to ISO 9237.

The average pore size of filter medium 10 can vary as desired. For example, filter medium 10 can have an average pore size from at least about 3 microns (e.g., at least about 10 microns, at least about 25 microns, or at least about 100 microns) and/or at most about 1,000 microns (e.g., at most about 500 microns, or at most about 125 microns). As used herein, the average pore size refers to the mean flow pore size measured by using a Coulter Porometer as described in ASTM F316-03.

Filter medium 10 can exhibit good ability to capture dust. For example, filter medium 10 can have an initial dust capture efficiency of at least about 25% (e.g., at least about 60%, at least about 80%, at least about 85%, or at least about 90%) and/or at most about 99.5% (e.g., at most about 98% or at most about 95%) measured according to a Palas flat sheet test. A description of the Palas flat sheet test used to determine an initial dust capture efficiency is provided in the test protocol section below.

Filter medium 10 can also have good dust holding properties. For example, filter medium 10 can have a dust holding capacity (DHC) of at least about 0.3 g (e.g., at least about 1 g or at least about 2 g) and/or at most about 3 g (e.g., at most about 2.5 g or at most about 2 g) according to a Palas flat sheet test. A description of the Palas flat sheet test to determine a dust holding capacity is provided in the test protocol section below. As another example, filter medium 10 can have a specific dust holding capacity of at least about 0.001 g/g (e.g., at least about 0.004 g/g) and/or at most about 1.0 g/g (e.g., at most about 0.9 g/g). As used herein, specific dust holding capacity can be calculated by dividing a DHC of a filter medium over a unit weight (e.g., per gram) of the filter medium. Alternatively, specific dust holding capacity can be calculated by dividing a DHC of a filter medium over a unit thickness (e.g., per millimeter) of the filter medium.

In some embodiments, filter medium 10 has both good dust capture and good dust holding properties. As an example, filter medium 10 can have an initial dust capture efficiency of at least about 25% (e.g., at least about 60%, at least about 80%, at least about 85%, or at least about 90%) and a dust holding capacity of at least about 0.3 g (e.g., at least about 1 g or at least about 2 g).

In some embodiments, at least one of the first, second, third, and fourth pluralities of fibers described above are made from an organic polymeric material (e.g., softwood fibers, cotton fibers, hardwood fibers, or synthetic organic polymers such as polyester or rayon). In certain embodiments, more than one (e.g., two, three, or all) of the first, second, third and fourth pluralities of fibers are made from an organic polymeric material.

In some embodiments, filter medium 10 can further include a binder distributed throughout the filter medium. In general, including a binder in a filter medium can significantly increase its strength (e.g., tensile strength measured according to ISO 1924-2 or Mullen Burst strength measured according to DIN 53113). The binder can include a polymeric material, such as polyvinyl acetate, an epoxy, a polyester, a polyvinyl alcohol, an acrylic (e.g., a styrene acrylic), or a phenolic resin. In some embodiments, the binder can be at least about 2% and/or at most about 35% (e.g., at most about 25%, at most about 15%, or at most about 5%) of the basis weight of filter medium 10. In general, the binder can be present in filter medium 10 with out without the presence of cross-linking agents (e.g., melamine, hexamine, or an epoxy hardener) or other additives (e.g., silicones, fluorocarbons, or catalysts such as ammonium chloride).

Filter medium 10 typically includes an interface between first phase 12 and second phase 16. In some embodiments, when filter medium 10 is prepared in a continuous wet laid process (e.g., forming first phase 12 and second phase 16 in a continuous liquid-based coating process), the interface can take the form of a transition phase which includes at least a portion of each of the first, second, third, and fourth pluralities of fibers intermingled with each other. Without wishing to be bound by theory, it is believed that the interface in filter medium 10 prepared by such a process can be substantially non-linear due to the interaction between the fibers in first phase 12 and second phase 16. For example, FIG. 4 shows a scanning electron microscope graph of a dual phase filter medium, in which the interface is substantially non-linear. Further, as no adhesive is typically used in a wet laid process, the interface is typically substantially free of any adhesive. First and second phases which include an interface that is substantially free of an adhesive may be joined by, for example, physical interactions between the fibers in each of the phases, or by other suitable methods that do not involve the use of an adhesive to join the phases. In some cases, first and second phases which include an interface that is substantially free of an adhesive are not joined by lamination.

In some embodiments, filter medium 10 can include one or more phases in additional to first phase 12 and second phase 16. An additional phase can be the same as or different from first phase 12 or second phase 16.

II. FILTER ELEMENTS AND SYSTEMS

Filter element 100 can be any of a variety of filter elements. Examples of filter elements include gas turbine filter elements, dust collector elements, heavy duty air filter elements, automotive air filter elements, HVAC air filter elements, HEPA filter elements, vacuum bag filter elements, fuel filter elements, and oil filter elements (e.g., lube oil filter elements or heavy duty lube oil filter elements).

Filter element 100 can also be in any suitable form, such as radial filter elements, panel filter elements, or channel flow elements. A radial filter element can include pleated filter media that are constrained within two open wire meshes in a cylindrical shape. During use, fluids can flow from the outside through the pleated media to the inside of the radial element.

When filter element 100 is a heavy duty air filter element, each of the open and tight phases in a single filter medium 10 can include a mixture of softwood fibers (e.g., Robur Flash fibers) and hardwood fibers (e.g., Suzano fibers). The weight ratio of the open and tight phases can be about 30:70 or greater. The weight ratio of the softwood fibers and hardwood fibers in the open phase can be, for example, about 85:15, and the weight ratio of the softwood fibers and hardwood fibers in the tight phase can be, for example, about 49:51.

When filter element 100 is an automotive air filter element, each of the open and tight phases in a single filter medium 10 can include a mixture of softwood fibers and hardwood fibers (e.g., Suzano fibers). The weight ratio of the open and tight phases can be about 50:50. The weight ratio of the softwood fibers and hardwood fibers in the open phase can be about 93:7, and the weight ratio of the softwood fibers and hardwood fibers in the tight phase can be about 65:35. Each of the open and tight phases can be made from two types of different softwood fibers (e.g., Robur Flash fibers and HPZ fibers). The weight ratio of the two types of different softwood fibers in the open phase can be about 83:10 (e.g., about 83% mercerized southern pine fibers and about 10% of Robur Flash fibers). The weight ratio of the two types of different softwood fibers in the tight phase can be about 40:25 (e.g., about 40% HPZ fibers and about 25% of Robur Flash fibers).

When filter element 100 is a fuel filter element, each of the open and tight phases in a single filter medium 10 can include a mixture of softwood fibers and hardwood fibers. The weight ratio of the open and tight phases can be about 50:50. The weight ratio of the softwood fibers and hardwood fibers in the open phase can be about 60:40, and the weight ratio of the softwood fibers and hardwood fibers in the tight phase can be about 6:94. The open phase can be made from two types of different softwood fibers with a weight ratio of about 40:20 (e.g., about 40% HPZ fibers and about 20% of Robur Flash), and a type of hardwood fibers (e.g., about 40% of Suzano fibers). The tight phase can be made of three types of different hardwood fibers with a weight ratio of about 48:36:10 (e.g., about 48% Suzano fibers, about 36% of Tarascon fibers, and about 10% Acacia fibers) and a type of softwood fibers (e.g., about 6% HPZ fibers).

The orientation of filter medium 10 relative to gas flow through a filter element/filter system can generally be selected as desired. In some embodiments, second phase 16 is upstream of first phase 12 in the direction of gas flow through a filter element. In certain embodiments, second phase 16 is downstream of first phase 12 in the direction of gas flow through a filter element. As an example, when the gas filter element is a gas turbine filter element or a heavy duty air filter element, second phase 16 can be upstream of first phase 12 in the direction of gas flow through the filter element. As another example, when improved depth filtration is desired, second phase 16 can be downstream of first phase 12 in the direction of gas flow through the filter element.

III. METHODS OF MANUFACTURING FILTER MEDIUM

In general, filter medium 10 can be made by any suitable methods.

In some embodiments, filter medium 10 can be prepared by a wet laid process as follows: First, a first dispersion (e.g., a pulp) containing first and second pluralities of fibers in a solvent (e.g., an aqueous solvent such as water) can be applied onto a wire conveyor in a papermaking machine (e.g., a fourdrinier or a rotoformer) to form first phase 12 supported by the wire conveyor. A second dispersion (e.g., another pulp) containing third and fourth pluralities of fibers in a solvent (e.g., an aqueous solvent such as water) is then applied onto first phase 12. Vacuum is continuously applied to the first and second dispersions of fibers during the above process to remove the solvent from the fibers, thereby resulting in an article containing first phase 12 and second phase 16. The article thus formed is then dried and, if necessary, further processed (e.g., calendered) by using known methods to form multi-phase filter medium 10. In some embodiments, first phase 12 and second phase 16 in a multi-phase filter medium 10 do not have macroscopic phase separation as shown in a conventional multi-layer filter medium (e.g., where one layer is laminated onto another layer in the filter medium), but instead contain an interface in which microscopic phase transition occurs depending on the fibers used or the forming process (e.g., how much vacuum is applied).

In some embodiments, a polymeric material can be impregnated into filter medium 10 either during or after filter medium 10 is being manufactured on a papermaking machine. For example, during the manufacturing process described above, after the article containing first phase 12 and second phase 16 is formed and dried, a polymeric material in a water based emulsion or an organic solvent based solution can be adhered to an application roll and then applied to the article under a controlled pressure by using a size press or gravure saturator. The amount of the polymeric material impregnated into filter medium 10 typically depends on the viscosity, solids content, and absorption rate of filter medium 10. As another example, after filter medium 10 is formed, it can be impregnated with a polymeric material by using a reverse roll applicator following the just-mentioned method and/or by using a dip and squeeze method (e.g., by dipping a dried filter media into a polymer emulsion or solution and then squeezing out the excess polymer by using a nip). A polymeric material can also be applied to filter medium 10 by other methods known in the art, such as spraying or foaming.

In general, filter medium 10 can be prepared by a continuous manufacturing process (e.g., a roll-to-roll manufacturing process) or can be prepared in a non-continuous, batch-to-batch manner.

The following examples are illustrative only and not intended as limiting.

IV. EXAMPLES

A. Test Protocols

Initial Dust Capture Efficiency and Dust Holding Capacity with a face velocity of 20 cm/s for one minute. The dust A 100 cm$^2$ surface area of a filter medium was challenged with a fine dust (0.1-80 μm) at a concentration of 200 mg/m$^3$ capture efficiency was measured using a Palas MFP2000 fractional efficiency photodetector. The dust capture efficiency was $[(1-[C/C0])*100\%]$, where C was the dust particle concentration after passage through the filter and C0 was the particle concentration before passage through the filter. The dust capture efficiency was measured after one minute and is referred to herein as the initial dust capture efficiency. The dust holding capacity is measured when the pressure reaches 1,800 Pa, and is the difference in the weight of the filter medium before the exposure to the fine dust and the weight of the filter medium after the exposure to the fine dust. This test is referred to herein as a Palas flat sheet test.

Liquid Filtration Efficiency Test and Liquid Filtration Retention Efficiency

Using a FTI Multipass Filter Test Stand (Fluid Technologies Inc., Stillwater, Okla.), an A2 fine dust is fed at a rate of 0.3 liters per minute into Mobil MIL-H-5606 fuel for a total flow rate of 1.7 liters per minute to contact a filter medium per ISO 16889 until a terminal pressure of 174 KPa above the baseline filter pressure drop is obtained. Particle counts (particles per milliliter) are taken at the particle sized selected (in this case 4, 5, 7, 10, 15, 20, 25 and 30 microns). The particle counts are taken upstream and downstream of the media at ten points equally divided over the time of the test. The average of upstream and downstream particle counts are taken at each selected particle size. From the average particle count upstream (injected—$C_0$) and the average particle count downstream (passed thru—C) the liquid filtration efficiency test value for each particle size selected is determined by the relationship $[(100-[C/C_0])*100\%]$. The liquid filtration retention efficiency as a function of time and particle size can also be measured by comparing the upstream and downstream particle counts (and determining efficiency $[(100-[C/C0])*100\%])$ at the sequential ten points in the test. This test is referred to herein as a multi-pass flat sheet test.

B. Examples

Example 1

Single phase and dual phase filter media were prepared on a trial paper machine (TPM). The single phase filter media were prepared using a blend of HPZ fibers and Suzano fibers. The weight ratios of the HPZ fibers and Suzano fibers in the blend were 90/10, 70/30, and 50/50, respectively. The dual phase filter media were prepared using HPZ fibers to form an open phase and Suzano fibers to form a tight phase, in which the weight ratios of the HPZ fibers and Suzano fibers were also 90/10, 70/30, and 50/50, respectively. To form a dual phase filter medium, a flow separation insert was used to separate the pulp containing HPZ fibers from the pulp containing Suzano fibers. The open phase was formed on the bottom of a dual phase filter medium and the tight phase was formed at the top. The dual phase filter media thus formed had a density equivalent to the single phase filter media. Both the single and dual phase filter media were not saturated with a resin for improving the strength of the media.

The filter media were refined by passing the pulps used to form the filter media twice through a refiner with a load energy of 35 Amps to meet specific air permeability target for each grade. Each type of filter medium was replicated three times. The filter media were then tested for their capacity performance using a Palas air stand according to the Palas flat sheet test described above, tested for their Mullen Burst strength according to DIN 53113, and tested for their tensile strength according to ISO 1924-2.

The results showed that the dual phase filter media exhibited from 30% to 100% increase in their specific dust holding capacity (DHC) compared to the single phase filter media. The results also showed that the dual phase filter media exhibited about 20% loss in strength compared to the single phase filter media.

Example 2

Three types of automotive air filter media (i.e., filter media 1, 2, and 3) in both single phase and dual phase of a sufficient size to allow for saturation and element testing were produced on a fourdrinier in a manner similar to that described in Example 1.

The single phase filter media were prepared using a blend of fibers. Specifically, single phase filter media 1 contained a blend of about 47 wt % of HPZ fibers and about 53 wt % of Cacia fibers, single phase filter media 2 contained a blend of about 70 wt % HPZ fibers and about 30 wt % of Suzano fibers, and single phase filter media 3 contained a blend of about 81 wt % HPZ fibers, about 9.5 wt % Leaf River fibers, and about 9.5 wt % Cacia fibers.

The dual phase filter media were prepared using HPZ fibers to form an open phase and Suzano, Cacia, or Leaf River fibers to form a tight phase. Specifically, dual phase filter media 1 contained about 47 wt % of HPZ fibers in the open phase and about 53 wt % of Cacia fibers in the tight phase, dual phase filter media 2 contained about 70 wt % HPZ fibers in the open phase and about 30 wt % of Suzano fibers in the tight phase, and dual phase filter media 3 contained about 81 wt % HPZ fibers in the open phase, and about 9.5 wt % Leaf River fibers and about 9.5 wt % Cacia fibers in the tight phase.

The above filter media were subsequently saturated with an epoxy resin by using an impregnation machine. The filter media were refined in the same manner as described in Example 1 to meet specific air permeability target for each grade.

Panel air elements and cylindrical elements containing each type of filter medium were produced. Specifically, a panel air element was produced by assembling a pleated filter medium between a molded silicone elastomer which holds the filter medium around the edges. A cylindrical element was produced by wrapping a pleated medium around a center tube, placing the article thus formed into a can, and sealing the can. The panel air element is generally used for high CFM automotive air, while the cylindrical element is generally used for low CFM heavy duty Air.

The performance of panel air elements was measured according to a standard method SAE J726. The results showed that elements containing the dual phase filter media exhibited an average 25% increase in DHC compared to elements containing the single phase filter media. Elements containing the dual phase filter media also exhibited about 3% increase in initial dust capture efficiency.

The performance of cylindrical elements was also measured according to the standard method SAE J726. Elements containing the dual phase filter media exhibited an average of 7% increase in overall DHC compared to elements containing the single phase filter media.

Mullen Burst and tensile strength of the single phase and dual phase filter media prepared above were measured. The results showed that the dual phase filter media exhibited a reduction in strength compared to the single phase filter media. The impact of the reduction was however less after the filter media was saturated with the epoxy resin. The Mullen Burst strength of the dual phase filter media was an average of about 80% of that of the single phase filter media depending upon the grade. Tensile strength comparisons between the two types of filter media showed a similar trend. In all cases, enough strength was present to effectively process the dual phase filter media.

Example 3

An interlayer design was used to produce dual phase filter media 4 using a rotoformer. As used herein, an interlayer design refers to a design that include a mixture of fibers with different characteristics in one or both of the open and tight phases. Specifically, dual phase filter media 4 contained about 45 wt % bottom phase (a tight phase) that included about 72 wt % Suzano fibers and about 28 wt % Robur Flash fibers, and about 55 wt % top phase (an open phase) that included about 15 wt % Suzano fibers and about 85 wt % Robur Flash fibers. Single phase filter media 4 were produced using about 40 wt % of Suzano fibers and about 60 wt % Robur Flash fibers. The performance of the filter media thus prepared are summarized in Table 1. Each value is an average of three tests per sample. After the filter media were formed, they were corrugated by compressing the media between two grooved corrugator rolls using sufficient pressure to result in machine directional grooves or corrugations in the filter media.

As shown in Table 1, dual phase filter media 4 exhibited significant improvement in DHC (about 26%) and specific DHC (from about 14-33%) compared to single phase filter media 4 when measured using the Palas flat sheet test described above. Further, dual phase filter media 4 showed little strength degradation compared to single phase filter media 4. It is believed that the interlayer design effectively addressed the strength loss issue observed in Examples 1 and 2.

TABLE 1

|  | Single phase filter media 4 | Dual phase filter media 4 | Units |
| --- | --- | --- | --- |
| Basis weight | 115 | 108 | g/m$^2$ (average) |
| Basis weight | 110 | 102 | g/m$^2$ (min.) |
| Basis weight | 120 | 115 | g/m$^2$ (max.) |
| Basis weight | 70.7 | 66.4 | lbs./3000 ft$^2$ |
| Caliper | 0.55 | 0.62 | mm @ 2 N/cm$^2$ (average) |
| Caliper | 0.53 | 0.5 | mm @ 2 N/cm$^2$ (min.) |
| Caliper | 0.59 | 0.85 | mm @ 2 N/cm$^2$ (max.) |
| Caliper | 21.7 | 24.4 | mils |
| Corrugation depth | 0.21 | 0.22 | mm @ 1.76 N/cm$^2$ |
| Air resistance | 7.44 | 7.92 | mbar @ 40 cm/s |
| Air permeability | 135 | 130 | l/s m$^2$ @ 200 Pa |
| Air permeability | 17.0 | 16.3 | cfm @ ½" WG |
| max. pore | 44.3 | 39.3 | μm (IPA) |
| many pores | 33.7 | 33.7 | μm (IPA) |
| Burst strength | 267 | 235 | kPa |
| Burst strength | 38.7 | 34.1 | psi |
| Tensile strength MD | 89 | 78 | N/15 mm |
| Tensile strength CD | 60 | 43.4 | N/15 mm |
| CD/MD ratio | 1.48 | 1.80 | CD = 1:MD |
| Tensile strength MD | 33.2 | 29.1 | lbs/inch |
| Tensile strength CD | 22.4 | 16.2 | lbs/inch |
| Elongation | 4.1 | 3 | % |
| Elongation | 10 | 7.3 | % |
| Initial Pressure Drop | 390 | 438 | Pa |
| Initial Efficiency | 94.7 | 94.9 | % |
| Final Efficiency | 100 | 100 | % |

TABLE 1-continued

| | Single phase filter media 4 | Dual phase filter media 4 | Units |
|---|---|---|---|
| Dust Holding Capacity, DHC | 0.76 | 0.96 | g |
| Specific DHC - g/g | 0.33 | 0.44 | g dust/g media |
| Specific DHC - g/mm | 1.36 | 1.55 | g dust/mm media |

Example 4

An interlayer approach was used to produce unsaturated single and dual phase filter media 5, 6, and 7 using a rotoformer.

Single phase (SP) filter media 5 contained a blend of about 28 wt % HPZ fibers, about 48 wt % Cacia fibers, and about 30 wt % Robur Flash fibers. Dual phase (DP) filter media 5 contained about 50 wt % of a tight phase and about 50 wt % of an open phase. The tight phase included about 12 wt % HPZ fibers, about 68 wt % Cacia fibers, and about 20 wt % Robur Flash fibers. The open phase included about 40 wt % HPZ fibers, about 30 wt % Cacia fibers, and about 30 wt % Robur Flash fibers.

Single phase filter media 6 contained a blend of about 58.2 wt % HPZ fibers and about 41.8 wt % of Suzano fibers. Dual phase filter media 6 contained 80 wt % of a tight phase and about 20 wt % of an open phase. The tight phase included about 52 wt % HPZ fibers, about 48 wt % Suzano fibers. The open phase included about 83 wt % HPZ fibers, about 17 wt % Robur Flash fibers.

Single phase filter media 7 contained a blend of about 24.5 wt % polyester fibers, about 43.7 wt % HPZ fibers, about 28.9 wt % Suzano fibers, and about 3 wt % CTMP fibers. Dual phase filter media 7 contained about 70 wt % of a tight phase and about 30 wt % of an open phase. The tight phase included about 26 wt % polyester fibers, about 37 wt % HPZ fibers, and about 37 wt % of Suzano fibers. The open phase included about 21 wt % polyester fibers, about 59 wt % HPZ fibers, about 10 wt % Suzano fibers, and about 10 wt % CTMP fibers.

The performance of the filter media thus prepared are summarized in Table 2. Each value is an average of three tests per sample.

TABLE 2

| | SP 5 | DP 5 | SP 6 | DP 6 | SP 7 | DP 7 | unit |
|---|---|---|---|---|---|---|---|
| Basis weight | 97 | 103 | 119 | 115 | 115 | 127 | g/m$^2$ (average) |
| Basis weight | 97 | 101 | 118 | 111 | 113 | 125 | g/m$^2$ (min.) |
| Basis weight | 98 | 105 | 121 | 122 | 116 | 130 | g/m$^2$ (max.) |
| Basis weight | 59.6 | 63.3 | 73.1 | 70.7 | 70.7 | 78.1 | lbs./3000 ft$^2$ |
| Caliper | 0.47 | 0.66 | 0.69 | 0.64 | 0.75 | 0.91 | mm @ 2 N/cm$^2$ (average) |
| Caliper | 0.46 | 0.5 | 0.67 | 0.58 | 0.72 | 0.61 | mm @ 2 N/cm$^2$ (min.) |
| Caliper | 0.49 | 0.91 | 0.72 | 0.67 | 0.8 | 1.27 | mm @ 2 N/cm$^2$ (max.) |
| Caliper | 18.5 | 26.0 | 27.2 | 25.2 | 29.6 | 35.9 | mils |
| Corrugation depth | 0 | 0 | 0 | 0 | 0 | 0 | mm @ 1.76 N/cm$^2$ |
| Air resistance | 4.82 | 6.54 | 2.28 | 2.38 | 1.27 | 1.52 | mbar @ 40 cm/s |
| Air permeability | 198 | 156 | 400 | 387 | 701 | 605 | l/s m$^2$ @ 200 Pa |
| Air permeability | 25.1 | 19.7 | 51.4 | 49.7 | 91.2 | 78.4 | cfm @ ½" WG |
| max. pore | 46 | 45.2 | 62.4 | 65.2 | 78.7 | 67.2 | μm (IPA) |
| many pores | 40 | 34.9 | 54.9 | 52.9 | 70.4 | 61.9 | μm (IPA) |
| Burst strength | 77 | 73 | 55 | 57 | 49 | 46 | kPa |
| Burst strength | 11.2 | 10.6 | 8.0 | 8.3 | 7.1 | 6.7 | psi |
| Tensile strength MD | 22.5 | 25.6 | 16.1 | 16.7 | 11.5 | 11.9 | N/15 mm |
| Tensile strength CD | 18.4 | 17.3 | 11.6 | 11.3 | 7.6 | 8.1 | N/15 mm |
| CD/MD ratio | 1.22 | 1.48 | 1.39 | 1.48 | 1.51 | 1.47 | CD = 1:MD |
| Tensile strength MD | 8.4 | 9.6 | 6.0 | 6.2 | 4.3 | 4.4 | lbs/inch |
| Tensile strength CD | 6.9 | 6.5 | 4.3 | 4.2 | 2.8 | 3.0 | lbs/inch |
| Elongation | 1.2 | 1.4 | 1.6 | 1.2 | 1.2 | 1.1 | % |
| Elongation | 1.6 | 2.8 | 2.5 | 2.8 | 1.6 | 1.6 | % |
| Initial Pressure Drop | 249 | 333 | 104 | 118 | | | Pa |
| Initial Efficiency | 93.3 | 96.6 | 78 | 82.5 | | | % |
| Final Efficiency | 100 | 100 | 100 | 99.8 | | | % |
| Dust Holding Capacity, DHC | 1.1 | 1.37 | 1.88 | 2.07 | 5.51* | 5.05* | g |
| Specific DHC - g/g | 0.56 | 0.66 | 0.79 | 0.9 | | | g dust/g media |
| Specific DHC - g/mm | 2.34 | 2.07 | 2.72 | 3.23 | | 1.6* | g dust/mm media |

*These values were measured by using a multi-pass flat sheet test.

As shown in Table 2, the dual phase filter media exhibited significant improvement in DHC when measured using the PALAS flat sheet test described above.

Example 5

Dual phase and single phase filter media were produced to target specifications using a rotoformer. Specifically, the following filter media were produced in the same manner as that described in Examples 3 and 4: (1) dual phase filter media 8, 9, and 10, and (2) single phase filter media 12 and 13 as controls. An interlayer approach was used to produce dual phase filter media. The compositions of these dual phase and single phase filter media are summarized in Table 3 below. In the dual phase filter media, the bottom phase was a tight phase and the top phase was an open phase.

TABLE 3

| Single phase (SP) | SP 12<br>Robur Flash - 60 wt %<br>Suzano - 40 wt % | SP 11<br>Robur Flash - 32.5 wt %<br>Suzano - 29 wt %<br>Westvaco HW - 38.5 wt % | |
|---|---|---|---|
| Dual phase (DP) | DP 8<br>Bottom Phase - 70 wt %<br>Robur Flash - 49 wt %<br>Suzano - 51 wt %<br>Top Phase - 30 wt %<br>Robur Flash - 85 wt %<br>Suzano - 15 wt % | DP 9<br>Bottom Phase - 70 wt %<br>Robur Flash - 43 wt %<br>Suzano - 57 wt %<br>Top Phase - 30 wt %<br>Robur Flash - 100 wt %<br>Suzano - 0 wt % | DP 10<br>Bottom Phase - 70 wt %<br>Robur Flash - 10 wt %<br>Suzano - 35 wt %<br>Westvaco HW - 55 wt %<br>Top Phase - 30 wt %<br>Robur Flash - 85 wt %<br>Suzano - 15 wt % |

The performance of these filter media were measured using the Palas flat sheet test described above. The results are summarized in Table 4 below.

TABLE 4

| Trial # | Initial Efficiency (%) | Final Efficiency (%) | Initial DP (Pa) | DHC (g) | Specific DHC (g/g) | Specific DHC (g/mm) |
|---|---|---|---|---|---|---|
| DP 8 | 88.50 | 99.99 | 415 | 1.352 | 0.60725 | 4.9746 |
| DP 9 | 92.13 | 99.99 | 438 | 1.000 | 0.45514 | 3.1073 |
| DP 10 | 91.84 | 100.00 | 465 | 1.064 | 0.50212 | 3.4908 |
| SP 11 | 92.07 | 100.00 | 451 | 0.920 | 0.42112 | 2.9376 |
| SP 12 | 90.11 | 100.00 | 421 | 0.824 | 0.36320 | 2.7034 |

As shown in Table 4, DP 8 and DP 9 exhibited at least 20% improvement in DHC and at least 15% improvement in specific DHC compared to SP 12. DP 10 also exhibited about 10% improvement in DHC and about 17% improvement in specific DHC compared to SP 11.

The strength of the filter media above were also tested. The results showed that the strength of the dual phase filter media was about 10% lower than that of the single phase filter media, and was more significant for DP10 as compared to SP11.

Example 6

Additional testing of DP 8 and SP 12 prepared in Example 5 were carried out as follows.

High pressure flat sheet testing of DP 8 and SP 12 were carried out using the Palas flat sheet test described above except that a higher terminal pressure of 4,500 Pa was applied. The results are summarized in Table 5 below. As shown in Table 5, DP 8 exhibited at least about 40% improvement in DHC and specific DHC compared to SP 12.

TABLE 5

| Type | Trial # | Initial dP (Pa) | Initial Eff. (%) | Final Eff. (%) | DHC (g) | Specific DHC/mm (g/mm) | Specific DHC/g (g/g) |
|---|---|---|---|---|---|---|---|
| Single phase | SP 12 | 383 | 89.3 | 100 | 2.06 | 2.75 | 0.91 |
| Dual phase | DP 8 | 379 | 84.8 | 100 | 2.87 | 4.33 | 1.29 |

DP 8 and SP 12 were incorporated into radial filter elements and tested using a radial element test designed to simulate heavy duty air face velocity of 8 ft/min. Compared to elements containing SP 12, elements containing DP 8 exhibited about 23% improvement in DHC and specific DHC calculated based on per square meter of a filter medium.

Example 7

A series of short trials were completed using a TPM to optimize the DHC of dual phase filter media. Filter media 13, 14, 15, 16, and 17 were produced. For each type of filter media, a single phase version (i.e., SP) and two dual phase versions (i.e., DP1 and DP2) were produced. For filter media 14, an addition dual phase version (i.e., DP2vv) with a tight phase at the bottom was produced. All of the dual phase filter media were produced by an interlayer design. The compositions of these filter media are summarized in Table 6 and the performance of the filter media are summarized in Tables 7 and 8.

TABLE 6

| | Filter media 13 (wt %) | Filter media 14 (wt %) | Filter media 15 (wt %) | Filter media 16 (wt %) | Filter media 17 (wt %) |
|---|---|---|---|---|---|
| Single phase (SP) | HPZ - 28%<br>Cacia - 48%<br>Robur Flash - 24% | HPZ - 71%<br>Suzano - 29% | Polyester - 23%<br>HPZ - 49%<br>Suzano - 22%<br>CTMP - 6% | HPZ - 64%<br>Brunswick Pine - 26%<br>Cacia - 10% | HPZ - 19%<br>Suzano - 63%<br>Tarascon - 18% |
| Dual phase (DP1) | Open Phase - 50%<br>HPZ - 40% | Open Phase - 50%<br>HPZ - 83% | Open Phase - 50%<br>HPZ - 60% | Open Phase - 50%<br>HPZ - 85% | Open Phase - 50%<br>HPZ - 35% |

TABLE 6-continued

|  | Filter media 13 (wt %) | Filter media 14 (wt %) | Filter media 15 (wt %) | Filter media 16 (wt %) | Filter media 17 (wt %) |
|---|---|---|---|---|---|
|  | Cacia - 20%<br>Robur Flash - 40%<br>Tight Phase - 50%<br>HPZ - 0%<br>Cacia - 68%<br>Robur Flash - 32% | Suzano - 17%<br>Tight Phase - 50%<br>HPZ - 60%<br>Suzano - 40% | Polyester - 30%<br>Suzano - 10%<br>Tight Phase - 50%<br>HPZ - 32%<br>Polyester - 16%<br>Suzano - 32%<br>CTMP - 20% | Brunswick Pine - 10%<br>Cacia - 5%<br>Tight Phase - 50%<br>HPZ - 42.5%<br>Brunswick Pine - 42.5%<br>Cacia - 15% | Suzano - 65%<br>Tight Phase - 50%<br>HPZ - 10%<br>Suzano - 54%<br>Tarascan - 36% |
| Dual phase (DP2) | Open Phase - 50%<br>HPZ - 56%<br>Cacia - 30%<br>Robur Flash - 14%<br>Tight Phase - 50%<br>HPZ - 0%<br>Cacia - 68%<br>Robur Flash - 32% | Open Phase - 50%<br>HPZ - 83%<br>Suzano - 7%<br>Robur Flash - 10%<br>Tight Phase - 50%<br>HPZ - 40%<br>Suzano - 35%<br>Robur Flash - 25% | Open Phase - 50%<br>HPZ - 50%<br>Polyester - 30%<br>Robur Flash - 20%<br>Tight Phase - 50%<br>HPZ - 32%<br>Polyester - 16%<br>Suzano - 32%<br>Robur Flash - 20% | Open Phase - 70%<br>HPZ - 87%<br>Brunswick Pine - 13%<br>Tight Phase - 30%<br>HPZ - 9%<br>Brunswick Pine - 55%<br>Cacia - 36% | Open Phase - 50%<br>HPZ - 40%<br>Suzano - 50%<br>Robur Flash - 10%<br>Tight Phase - 50%<br>Suzano - 54%<br>Tarascan - 36%<br>Acacia - 10% |

TABLE 7

| Samples | | test results | | | | Palas | | | Multipass | | |
|---|---|---|---|---|---|---|---|---|---|---|---|
|  |  | g/m² [g/m²] | mm @ 2 N/cm² | l/m²s @ 200 Pa | Burst Strength | initial efficiency | initial pressure | DHC [mg/cm²] | efficiency 50% [µm] | efficiency 90% [µm] | DHC [g/200 cm²] |
| Filter media 14 | SP | 119 | 0.60 | 507 | 90 | 63.9 | 107 | 8.36 |  |  |  |
|  | DP 1 | 117 | 0.59 | 494 | 83 | 72.4 | 83 | 7.88 |  |  |  |
|  | DP 2 | 117 | 0.58 | 507 | 72 | 59.2 | 84 | 9.56 |  |  |  |
|  | DP 2vv | 109 | 0.56 | 514 | 77 | 69.6 | 95 | 11.96 |  |  |  |
| Filter media 13 | DP 1 | 105 | 0.43 | 125 | 138 | 87.2 | 319 | 8.12 |  |  |  |
|  | DP2 | 108 | 0.47 | 160 | 120 | 89 | 319 | 7.88 |  |  |  |
|  | SP | 107 | 0.45 | 176 | 132 | 89.1 | 319 | 6.44 |  |  |  |
| Filter media 15 | DP 1 | 119 | 0.64 | 608 | 50 |  |  |  | 18.1 | 26.6 | 3.72 |
|  | DP 2 | 121 | 0.66 | 627 | 60 |  |  |  | 20.3 | 30.1 | 4.91 |
|  | SP | 124 | 0.67 | 662 | 56 |  |  |  | 20.6 | 31.2 | 4.26 |
| Filter media 16 | DP 1 | 162 | 0.81 | 396 | 118 |  |  |  | 19.2 | 30 | 4.28 |
|  | DP 2 | 164 | 0.80 | 355 | 71 |  |  |  | 18.3 | 26.4 | 4.25 |
|  | SP | 164 | 0.79 | 403 | 132 |  |  |  | 20.6 | 30.2 | 3.57 |
| Filter media 17 | DP 1 | 186 | 0.45 | 19 | 299 |  |  |  | 3.7 | 5.25 | 0.62 |
|  | DP 1 | 187 | 0.43 | 16 | 319 |  |  |  | 4 | 5.5 | 0.6 |
|  | DP 2 | 181 | 0.45 | 15 | 280 |  |  |  |  |  |  |
|  | SP | 189 | 0.47 | 16 | 288 |  |  |  | 4 | 5.5 | 0.38 |

TABLE 8

| Grade | Single Phase DHC/g | Dual Phase 2 DHC/g | DHC increase/% |
|---|---|---|---|
| Filter media 14 | 8.36 | 11.96 | 43.06 |
| Filter media 13 | 6.44 | 7.88 | 22.36 |
| Filter media 15 | 4.26 | 4.91 | 15.26 |
| Filter media 16 | 3.57 | 4.25 | 19.05 |
| Filter media 17 | 0.38 | 0.60 | 57.89 |

As shown in Tables 7 and 8, interlayer designs in the dual phase filter media showed positive results (i.e., with significantly improved DHC and strength properties maintained) as compared to the single phase filter media. The DP2 version of each type of filter media yielded the most improvement in DHC compared to its corresponding single phase control. In filter media 14, DP2vv, which contained a tight phase on the bottom, showed a 43% improvement in DHC. This approach appeared to yield the highest DHC improvement.

Example 8

Trial production was carried out to optimize dual phase filter media prepared in Example 7. Specifically, optimized versions of filter media 13 (for use in a heavy duty air filter element), 14 (for use in an automotive air filter element), 15 (for use in lube oil filter element), 16 (for use in a heavy duty lube oil filter element), and 17 (for use in a fuel filter element) were produced. For each type of filter media, a single phase version and a dual phase version of each grade of filter media were produced. A fourdrinier and an impregnator were used to produce single and dual phase filter media, which were saturated with a solvent based phenolic resin. All dual phase filter media were produced with a tight phase on the bottom using an interlayer design. The compositions of these filter media are summarized in Table 9 and the performance of the filter media are summarized in Tables 10 and 11.

TABLE 9

|  | Filter media 13 (wt %) | Filter media 14 (wt %) | Filter media 15 (wt %) | Filter media 16 (wt %) | Filter media 17 (wt %) |
|---|---|---|---|---|---|
| Single phase | HPZ - 28% Cacia - 48% Robur Flash - 24% | HPZ - 71% Suzano - 29% | Polyester - 23% HPZ - 49% Suzano - 22% CTMP - 6% | HPZ - 64% Brunswick Pine - 26% Cacia - 10% | HPZ - 19% Suzano - 63% Tarascon - 18% |
| Dual phase | Open Phase - 50% HPZ - 56% Cacia - 30% Robur Flash - 14% Tight Phase - 50% HPZ - 0% Cacia - 68% Robur Flash - 32% | Open Phase - 50% HPZ - 83% Suzano - 7% Robur Flash - 10% Tight Phase - 50% HPZ - 40% Suzano - 35% Robur Flash - 25% | Open Phase - 50% HPZ - 50% Polyester - 30% Robur Flash - 20% Tight Phase - 50% HPZ - 32% Polyester - 16% Suzano - 32% Robur Flash - 20% | Open Phase - 50% HPZ - 85% Brunswick Pine - 10% Cacia - 5% Tight Phase - 50% HPZ - 42.5% Brunswick Pine - 42.5% Cacia - 15% | Open Phase - 50% HPZ - 40% Suzano - 40% Robur Flash - 20% Tight Phase - 50% HPZ - 6% Suzano - 48% Tarascan - 36% Acacia - 10% |

TABLE 10

Palas Flat Sheet Test Results

| Samples | | Initial Efficiency (%) | DHC (g) | Specific DHC (g/g) | Specific DHC (g/mm) |
|---|---|---|---|---|---|
| Filter media 13 | Single phase | 87.5 | 0.60 | 0.46 | 1.36 |
| | Dual phase | 87.2 | 0.44 | 0.62 | 1.73 |
| Dual phase change (%) | | −0.3 | 28.57 | 33.15 | 27.32 |
| Filter media 14 | Single phase | 58.1 | 0.76 | 0.54 | 1.38 |
| | Dual phase | 59.4 | 1.04 | 0.73 | 1.76 |
| Dual phase change (%) | | 2.2 | 36.84 | 35.77 | 27.93 |

TABLE 11

Multi-pass flat sheet Test Results

| Samples | | Initial Efficiency (%) | DHC (g) | Specific DHC (g/g) | Specific DHC (g/mm) |
|---|---|---|---|---|---|
| Filter media 15 | Single phase | 13.0 | 4.28 | 1.43 | 6.47 |
| | Dual phase | 18.5 | 5.24 | 1.91 | 8.04 |
| Dual phase change (%) | | 42.3 | 22.6 | 33.6 | 24.3 |
| Filter media 16 | Single phase | 22.5 | 3.60 | 0.90 | 4.94 |
| | Dual phase | 17.0 | 5.50 | 1.37 | 6.59 |
| Dual phase change (%) | | −24.4 | 52.8 | 52.2 | 33.4 |
| Filter media 17 | Single phase | 99.7 | 0.36 | 0.09 | 0.80 |
| | Dual phase | 99.2 | 0.55 | 0.13 | 1.15 |
| Dual phase change (%) | | −.05 | 52.8 | 50.0 | 43.8 |

The optimized dual phase filter media showed from about 23% to about 52% increase in DHC and specific DHC compared to the single phase filter media, while strength loss in the dual phase filter media averaged about 10% compared to the single phase filter media.

Other embodiments are in the claims.

What is claimed is:

1. An article, comprising:
   a first phase comprising a first plurality of fibers and a second plurality of fibers different from the first plurality of fibers;
   a second phase comprising a third plurality of fibers and a fourth plurality of fibers different from the third plurality of fibers, the third plurality of fibers being the same as or different from the first or second plurality of fibers and the fourth plurality of fibers being the same as or different from the first or second plurality of fibers;
   a transition phase between the first and second phases, wherein the transition phase comprises at least a portion of the first plurality of fibers, at least a portion of the second plurality of fibers, at least a portion of the third plurality of fibers, and at least a portion of the fourth plurality of fibers, and wherein at least a portion of the first plurality of fibers, at least a portion of the second plurality of fibers, at least a portion of the third plurality of fibers, and at least a portion of the fourth plurality of fibers are intermingled with each other,
   wherein the first, second, third and fourth pluralities of fibers are wet laid,
   wherein the air permeability of the first plurality of fibers is higher than the air permeability of the second plurality of fibers, wherein the air permeability of the third plurality of fibers is higher than the air permeability of the fourth plurality of fibers, and wherein the first, and third pluralities of fibers are made from an organic polymeric material,
   wherein the first or third plurality of fibers have an average fiber length from about 1.5 mm to about 6 mm,
   wherein a weight ratio of the first plurality of fibers to the second plurality of fibers is from about 50:50 to about 97:3,
   wherein the basis weight ratio of the first phase to the second phase is from about 30:70 to about 70:30,
   wherein the first and second phases form a wet laid structure that is configured as a filter medium, and
   wherein the filter medium has a mean flow pore size of at least about 25 microns and at most about 1,000 microns.

2. The article of claim 1, wherein the air permeability of the first or third plurality of fibers is from about 50 CFM to about 350 CFM.

3. The article of claim 2, wherein the air permeability of the first or third plurality of fibers is from about 100 CFM to about 200 CFM.

4. The article of claim 1, wherein the air permeability of the second or fourth plurality of fibers is from about 5 CFM to about 50 CFM.

5. The article of claim 4, wherein the air permeability of the second or fourth plurality of fibers is from about 15 CFM to about 25 CFM.

6. The article of claim 1, wherein a weight ratio of the first and second pluralities of fibers is from about 50:50 to about 90:10, and a weight ratio of the third and fourth pluralities of fibers is from about 10:90 to about 50:50.

7. The article of claim 6, wherein a weight ratio of the first and second pluralities of fibers is from about 50:50 to about 70:30, and a weight ratio of the third and fourth pluralities of fibers is from about 25:75 to about 50:50.

8. The article of claim 7, wherein a weight ratio of the first and second pluralities of fibers is from about 60:40 to about 70:30, and a weight ratio of the third and fourth pluralities of fibers is from about 30:70 to about 50:50.

9. The article of claim 1, wherein the second or fourth plurality of fibers have an average fiber length from about 0.5 mm to about 2 mm.

10. The article of claim 1, wherein the first or third plurality of fibers comprise softwood fibers, cotton fibers, polyester fibers, polyvinyl alcohol binder fibers, or rayon fibers, and the second or fourth plurality of fibers comprise hardwood fibers, polyethylene fibers, or polypropylene fibers.

11. The article of claim 10, wherein the first or third plurality of fibers comprise softwood fibers, and the second or fourth plurality of fibers comprise hardwood fibers.

12. The article of claim 1, wherein the first phase has a higher air permeability than the second phase.

13. The article of claim 1, wherein a basis weight ratio of the first and second phases is from about 40:60 to about 60:40.

14. The article of claim 1, wherein the article further comprises a binder.

15. The article of claim 14, wherein the binder comprises polyvinyl acetate, an epoxy, a polyester, a polyvinyl alcohol, an acrylic, or a phenolic resin.

16. The article of claim 15, wherein the binder is at least about 2% of the basis weight of the article and at most about 35% of the basis weight of the article.

17. The article of claim 1, wherein the article has a mean flow pore size from about 3 microns to about 1,000 microns.

18. The article of claim 1, wherein the article has a mean flow pore size from about 25 microns to about 125 microns.

19. The article of claim 1, wherein the article has a dust holding capacity from about 0.3 g to about 3 g measured according to a Palas flat sheet test.

20. The article of claim 1, wherein the article has an initial dust capture efficiency from about 25% to about 99.5%.

21. The article of claim 20, wherein the article has an initial dust capture efficiency from about 60% to about 99.5%.

22. The article of claim 1, wherein each of the first, second, third, and fourth pluralities of fibers is made from an organic polymeric material.

23. The article of claim 1, wherein the interface between the first and second phases is substantially non-linear.

24. The article of claim 1, wherein the interface between the first and second phases is substantially free of an adhesive.

25. The article of claim 1, wherein the first phase has a first air permeability, the second phase has a second air permeability, the transition phase has a third air permeability, wherein the first air permeability is greater than the second air permeability, and wherein the third air permeability is between the first and second air permeabilities.

26. The article of claim 1, wherein the first plurality of fibers are hardwood or softwood fibers, and the fourth plurality of fibers are hardwood or softwood fibers.

27. The article of claim 1, wherein the article has an air permeability between about 2 CFM and about 160 CFM.

28. The article of claim 1, wherein the article has an air permeability between about 2 CFM and about 160 CFM.

29. A filter element, comprising one or more articles of claim 1.

30. A method, comprising:
disposing through a wet laid process a first dispersion containing first and second pluralities of fibers in a first solvent onto a wire to form a first phase;
while the first and second pluralities of fibers are on the wire, disposing a second dispersion containing third and fourth pluralities of fibers in a second solvent onto the first and second pluralities of fibers to form a second phase;
at least partially removing the first and second solvents, thereby resulting in an article of claim 1.

* * * * *